A. A. WOLOFF.
ROTARY VALVE AND OILING SYSTEM THEREFOR FOR EXPLOSIVE ENGINES.
APPLICATION FILED MAR. 23, 1914. RENEWED APR. 26, 1915.
1,166,397. Patented Dec. 28, 1915.
2 SHEETS—SHEET 1.
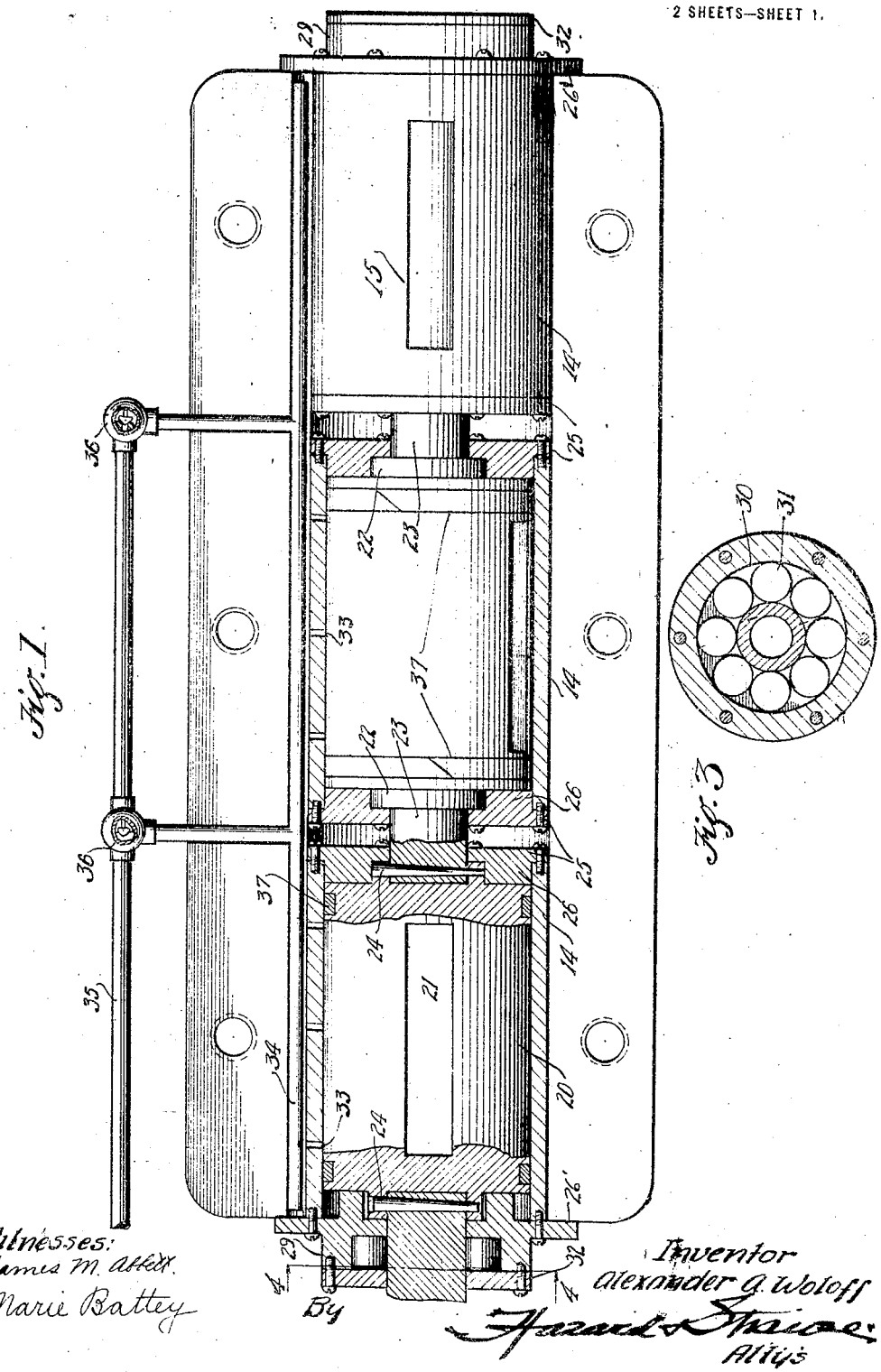

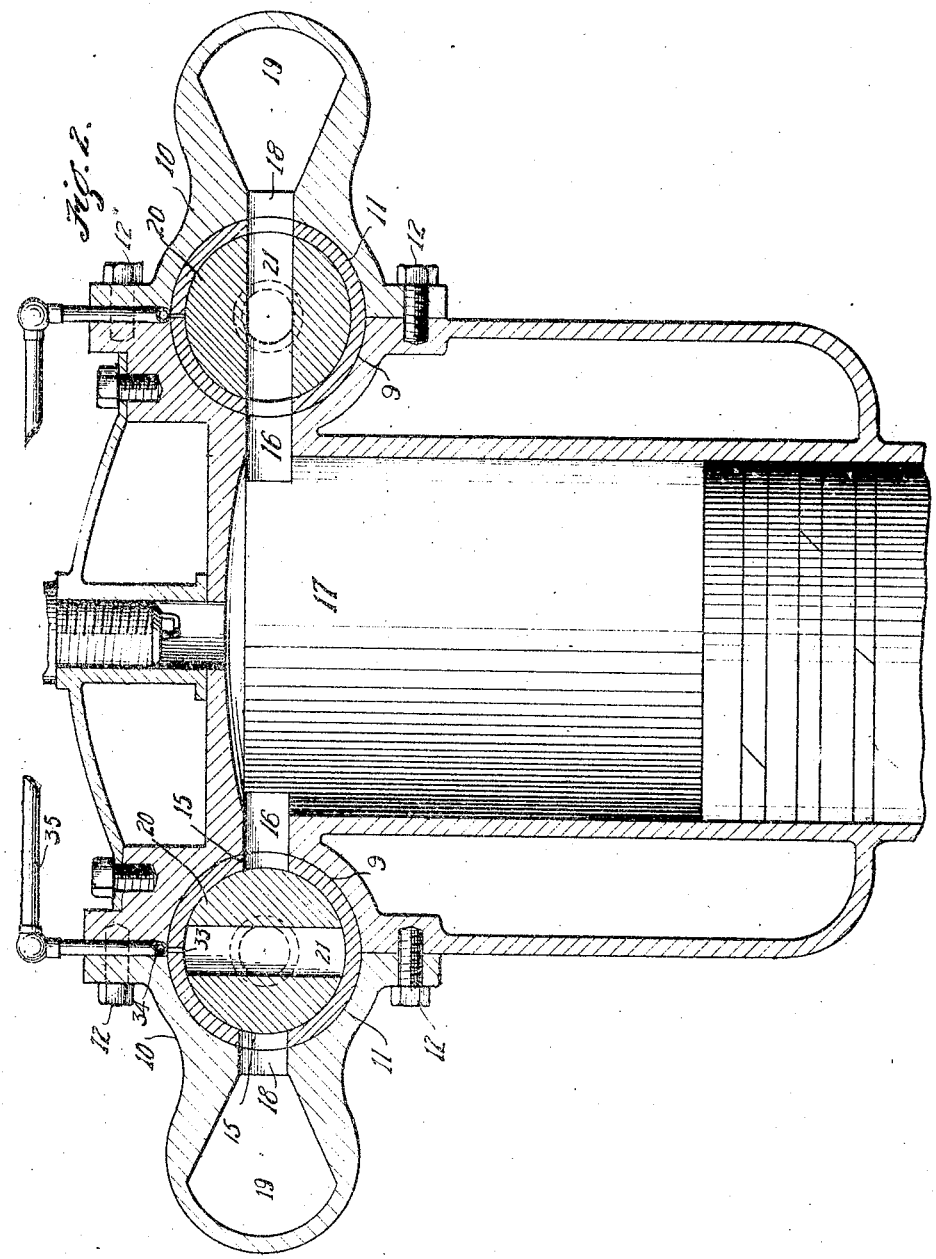

UNITED STATES PATENT OFFICE.

ALEXANDER A. WOLOFF, OF LOS ANGELES, CALIFORNIA.

ROTARY VALVE AND OILING SYSTEM THEREFOR FOR EXPLOSIVE-ENGINES.

1,166,397.      Specification of Letters Patent.      Patented Dec. 28, 1915.

Application filed March 23, 1914, Serial No. 826,562. Renewed April 26, 1915. Serial No. 24,153.

*To all whom it may concern:*

Be it known that I, ALEXANDER A. WOLOFF, a citizen of the United States, residing at Los Angeles, in the county of Los Angeles, State of California, have invented new and useful Improvements in Rotary Valves and Oiling System Therefor for Explosive-Engines, of which the following is a specification.

This invention relates to a rotary valve for explosive engines.

It is the object of this invention to provide a rotary valve and a bearing therefor so constructed and arranged as to maintain the valve in proper alinement.

A further object is to provide means in a rotary valve for multiple cylinder explosive engines in which the valve is composed of a series of connected units, one for each cylinder, so mounted as to obviate leakage of the gaseous mixtures around the valves.

A further object is to provide a rotary valve and a mounting therefor by which the valve can be readily removed and replaced from the side of the engine, and which is so constructed that the valve units may be readily renewed and replaced when excessively worn.

A further object is to provide means for effectively lubricating the valve.

Other objects will appear hereinafter.

The invention is illustrated in the accompanying drawings, in which:

Figure 1 is a detail longitudinal view of the valve with parts broken away, illustrating the manner of constructing and mounting the same as seen in side elevation. Fig. 2 is a detail section of an engine cylinder, showing the invention as applied, and illustrating the valve in cross section. Fig. 3 is a detail section on the line 4—4 of Fig. 1, showing the roller bearings of the valve.

The valve casings consist of semi-cylindrical channels 9 formed on opposite sides of the engine casing adjacent the upper ends of the cylinders therein and extending longitudinally thereof, and cap plates 10 having corresponding semi-cylindrical channels 11 formed on their inner faces adapted to register with the channels 9 to form a cylindrical valve seat; the cap plates 10 being removably secured in place on the engine cylinder by means of cap screws 12 or in any other suitable manner. The cylindrical valve casing formed by the channels 9 and 11 extends throughout the length of the engine casing and is open at both ends and may extend throughout the length of the engine casing, as where the engine cylinders are all formed in one unit, or may be divided into several portions, where the engine cylinders are arranged in several units.

For the purpose of clearness, the description of the parts will now be confined to the valve section of one side of one unit of the engine, as illustrated in Fig. 1, as the other sections correspond thereto, except as to their arrangements in relation to the engine casing.

Mounted within the valve casing are a plurality of cylindrical bushings 14; a bushing 14 being provided for each engine cylinder, and formed with diametrically opposite longitudinally extending openings 15 formed in its walls on a horizontal plane, which register with ports 16 leading to the interior of the engine cylinders 17 on one side of the bushing and communicating with the openings 18 leading to the manifold passage 19 formed in the cap 10 communicating either with the source of explosive mixture supply, as a carbureter, on the intake side of the engine and communicating with the exhaust pipe on the opposite side of the engine.

Revolubly mounted within each of the bushings 14 is a cylindrical rotary valve member 20 having an elongated longitudinally extending slot 21 passing diametrically therethrough adapted to be moved into register with the ports 15 to open communication between the interior of the cylinder 17 and the passage 19 on rotation of the valve member.

Each of the cylinders 20 is formed with an annular flange or hub 22 on its opposite ends concentric with the axis thereof, which hubs are adapted to receive the ends of studshafts 23, which, adjacent the cylinder valves, are connected together; the engagement between the hubs 22 and the shafts 23 being effected by means of tapered pins 24 which pass through the hubs and studshafts, as particularly shown in Fig. 1.

As a means for retaining the cylinder valves 20 and the bushings 14 in proper relation to each other, cap disks 25 having central openings for the reception of the stud-shafts 23 are secured to the ends of the bushings 14 by means of screws 26 or in any other suitable manner; the cap disks 25 having upwardly projecting annular flanges 26 adapted to abut against the ends of the cylinder valve 20 and encompass the hubs 22 contiguous thereto, thus serving the double function of preventing longitudinal movement of the bushings and the cylinder valves in relation to each other and guarding the tapered pins 24 to prevent their accidental disengagement. The cylinder valves 20 are thus securely connected together in alinement and, being revoluble in the bushings 14 which are clamped in position against movement in the recesses 9 and 11 by the caps 10, are capable of being rotated in unison.

The rotation of the valves is effected through a short shaft 27 connecting with the end of the outermost valve and geared to the crank shaft 8 through suitable gearing and shafting mounted in the housing 28 at the end of the engine cylinder. As a means for providing a roller bearing support for the valve members to obviate frictional wear between the valves and the bushings, the end plates 26' at the outer ends of the outermost bushings 14 are formed with annular flanges 29 spaced from the stud-shafts 23 or shaft 27 to form an annular race-way 30 for a series of taper roller bearings 31; the race-way and bearings being incased by means of end plates 32 secured on flanges 29.

The cylinder valves are of equal diameter throughout their length and are of sufficiently smaller diameter than the interior diameters of the bushings 14 as to afford a clearance therebetween to allow for expansion and contraction of the valve without binding and at the same time form oil distributing space throughout the periphery of the cylinder valves to which a lubricating oil is delivered through apertures 33 in the bushings 13 at their highest point and communicating with a perforated oil feed pipe 34 interposed between the cap 10 and the engine casing in the recess in the latter and connecting with an oil supply pipe 35 leading from any source of supply through check valves 36 which prevent back pressure from forcing the oil back too far from the valves, in case there should be such pressure.

As a means for preventing leakage of gases between the valve members and the bushings packing rings 37 of any suitable character are mounted in annular channels being formed in the valve members between their ends and the ends of the passages 21 and bearing against the inner peripheries of the bushings 14.

By constructing a rotary valve as herein set forth access to the valve may be readily had by removing the cap plate 10 and the valves may be easily removed from their casing, and in event any one of the valve sections or bushings becomes damaged or worn it can be readily replaced without necessitating the removal of the entire valve.

In application of the invention here shown, separate valves are provided for controlling the intake of explosive mixture therefrom; a valve being provided on each side of the engine cylinders for this purpose as shown in Fig. 2; the passages 21 and the ports 16 being so proportioned in relation to each other as to permit of the usual cycle of operation, as is common in rotary valve construction.

What I claim is:

1. In a rotary valve for internal combustion engines, a valve casing formed of separable parts having registering semi-cylindrical channels on their adjacent faces, a plurality of tubular bushings in said casing, a rotary valve member in each of said bushings, stud-shafts connecting the adjacent valve members, means on said bushings engaging the ends of the valve members to retain the bushings and valve members against longitudinal movement in relation to each other.

2. In a rotary valve for internal combustion engines, a valve casing, a plurality of separate alined bushings arranged in said casing, a cylindrical rotary valve member in each of said bushings having an external diameter less than the internal diameter of the bushings to form a clearance therebetween, disks attached to the ends of the bushings and contacting the ends of the valve members, and means connecting adjacent valve members through said disks.

3. In a rotary valve for internal combustion engines, a valve casing, a plurality of alined bushings in said casing having oppositely disposed ports therein, a rotary valve member in each of said bushings formed with a passage extending diametrically therethrough adapted to register with the ports in the bushings, hubs on the ends of said valve members, stud-shafts detachably connected to said hubs, and end disks encircling the stud-shafts and connected to the ends of the bushings.

4. In a rotary valve for internal combustion engines, a valve casing, a plurality of alined bushings in said casing having oppositely disposed ports therein, a rotary valve member in each of said bushings formed with a passage extending diametrically therethrough adapted to register with the ports in the bushings, hubs on the ends of said valve members, stud-shafts detachably connected to said hubs, end disks encircling the stud-shafts and connected to the ends of the bushings, and annular flanges on said disks engaging the ends of the valve members and encompassing the hubs thereon in close proximity thereto.

5. The combination of a plurality of alined rotary valves, separate bushings encircling each of the valves having perforations formed therein, a casing encompassing the bushings, a perforated oil feed pipe in the casing for delivering lubricating oil to the perforations in the bushings, an oil supply pipe leading to the feed pipe, and check valves interposed between the feed pipe and supply pipe for preventing back flow of the oil.

In witness that I claim the foregoing I have hereunto subscribed my name this 5th day of March, 1914.

ALEXANDER A. WOLOFF.

Witnesses:
 RALPH W. AVERY,
 H. R. STAPLES.